United States Patent
Ryu et al.

(10) Patent No.: US 8,885,579 B2
(45) Date of Patent: Nov. 11, 2014

(54) UPLINK SYNCHRONIZATION IN MULTIPLE CARRIER SYSTEM

(75) Inventors: Ki Seon Ryu, Anyang-si (KR); Eun Jong Lee, Anyang-si (KR); Young Soo Yuk, Anyang-si (KR); Yong Ho Kim, Anyang-si (KR)

(73) Assignee: LG Electronics Inc., Seoul (KR)

( * ) Notice: Subject to any disclaimer, the term of this patent is extended or adjusted under 35 U.S.C. 154(b) by 855 days.

(21) Appl. No.: 13/128,403

(22) PCT Filed: Nov. 10, 2009

(86) PCT No.: PCT/KR2009/006582
§ 371 (c)(1),
(2), (4) Date: May 9, 2011

(87) PCT Pub. No.: WO2010/053334
PCT Pub. Date: May 14, 2010

(65) Prior Publication Data
US 2011/0211571 A1 Sep. 1, 2011

Related U.S. Application Data

(60) Provisional application No. 61/113,157, filed on Nov. 10, 2008.

(30) Foreign Application Priority Data

Jul. 24, 2009 (KR) .................. 10-2009-0067753

(51) Int. Cl.
*H04W 4/00* (2009.01)
*H04J 3/06* (2006.01)
*H04W 56/00* (2009.01)
*H04L 27/26* (2006.01)
*H04L 5/00* (2006.01)

(52) U.S. Cl.
CPC .......... *H04J 3/0682* (2013.01); *H04W 56/0045* (2013.01); *H04L 27/2675* (2013.01); *H04L 27/2613* (2013.01); *H04L 5/001* (2013.01)
USPC ............................. 370/329; 370/350; 455/450

(58) Field of Classification Search
CPC .......... H04L 5/003; H04L 1/88; H04L 5/0078; H04L 5/0096; H04L 5/0098; H04W 36/0083; H04W 36/0055; H04W 72/04; H04W 72/00
See application file for complete search history.

(56) References Cited

U.S. PATENT DOCUMENTS 7,515,559 B2 * 4/2009 Koo et al. ..................... 370/328
8,054,770 B2 * 11/2011 Son et al. ..................... 370/311

(Continued)

FOREIGN PATENT DOCUMENTS

| EP | 1571770 | 9/2005 |
| EP | 1701461 | 9/2006 |

(Continued)

OTHER PUBLICATIONS

Chou, et al., "Proposal for Multicarrier uplink control structure," IEEE 802.16 Broadband Wireless Access Working Group, IEEE C802.16m-081303r1, May 2008, 7 pages.

(Continued)

*Primary Examiner* — Melanie Jagannathan
(74) *Attorney, Agent, or Firm* — Lee, Hong, Degerman, Kang & Waimey

(57) ABSTRACT

A method and apparatus of uplink synchronization in a multiple carrier system is provided. After establishing Uplink synchronization for a primary carrier, a secondary carrier based on activation information via the primary carrier is activated. A periodic ranging via the secondary carrier is performed to adjust uplink synchronization for the secondary carrier.

14 Claims, 5 Drawing Sheets

(56) References Cited

U.S. PATENT DOCUMENTS

| | | |
|---|---|---|
| 2004/0176094 A1* | 9/2004 | Kim et al. .................. 455/438 |
| 2005/0007977 A1 | 1/2005 | Jou |
| 2005/0058058 A1* | 3/2005 | Cho et al. .................. 370/208 |
| 2009/0274120 A1* | 11/2009 | Chou .......................... 370/331 |
| 2011/0019622 A1* | 1/2011 | Lee et al. .................. 370/328 |
| 2013/0148603 A1* | 6/2013 | Lee et al. .................. 370/329 |

FOREIGN PATENT DOCUMENTS

| | | |
|---|---|---|
| EP | 2117156 | 11/2009 |
| JP | 2007-221745 A | 8/2007 |
| KR | 10-2007-0023484 A | 2/2007 |
| KR | 10-2008-0012443 A | 2/2008 |
| WO | 2009/135436 | 11/2009 |
| WO | 2010/025681 | 3/2010 |

OTHER PUBLICATIONS

European Patent Office Application Serial No. 09825017.8, Search Report dated Apr. 8, 2014, 9 pages.

* cited by examiner

UPLINK SYNCHRONIZATION IN MULTIPLE CARRIER SYSTEM

CROSS-REFERENCE TO RELATED APPLICATIONS

This application is the National Stage filing under 35 U.S.C. 371 of International Application No. PCT/KR2009/006582, filed on Nov. 10, 2009, which claims the benefit of earlier filing date and right of priority to Korean Application No. 10-2009-0067753, filed on Jul. 24, 2009, and also claims the benefit of U.S. Provisional Application Serial No. 61/113,157, filed Nov. 10, 2008, the contents of which are all incorporated by reference herein in their entirety.

TECHNICAL FIELD

The present invention relates to wireless communication and, more particularly, to a method and apparatus for uplink synchronization in a multiple carrier system.

BACKGROUND ART

The 3rd Generation Partnership Project (3GP) Long Term Evolution (LTE) and the Institute of Electrical and Electronics Engineers (IEEE) 802.16m are being developed as candidates of a next-generation wireless communication system. The 802.16m standard involves two aspects: continuity of the existing IEEE 802.16e standard and the future standard for a next-generation IMT-Advanced system. Thus, the 802.16m standard is required to meet advanced requirements for the IMT-Advanced system while maintaining compatibility with a mobile WiMAX system based on the IEEE 802.16e standard.

A wireless communication system generally uses a single bandwidth to transmit data. For example, a 2nd-generation wireless communication system uses a bandwidth of 250 kHz to 1.25 MHz, and a 3rd-generation wireless communication system uses a bandwidth of 5 MHz to 10 MHz. In order to support an increasing transmission capacity, recently, the next-generation system continues to extend a bandwidth of 20 MHz or larger. It is inevitable to increase the bandwidth in order to improve the transmission capacity, but the support of a large bandwidth may cause much power consumption in case where the required quality of service is low.

Thus, a multi-carrier system emerges to transmit and/or receive data in a wideband through multiple carriers. A carrier is defined by a center frequency and its bandwidth. For example, if a single carrier corresponds to a bandwidth of 5 MHz, a bandwidth of a maximum 20 MHz can be supported by using four carriers.

The use of the plurality of carriers needs a method for effectively obtaining or maintaining synchronization of the carriers. Ranging is one of methods for obtaining uplink synchronization in the IEEE 802.16 standard. During the ranging, a mobile station obtains or maintains uplink synchronization by adjusting an uplink transmission parameter.

The ranging may be performed for every carriers. However, if the number of available carriers increases, the ranging may be delayed and power consumption may increase.

DISCLOSURE OF INVENTION

Technical Problem

The present invention provides a method and apparatus for uplink synchronization capable of quickly obtaining uplink synchronization for multiple carriers.

Solution to Problem

In an aspect, a method of uplink synchronization in a multiple carrier system is provided. The method may be performed by a mobile station. The method includes establishing uplink synchronization for a primary carrier, activating a secondary carrier based on activation information via the primary carrier, and performing a periodic ranging via the secondary carrier to adjust uplink synchronization for the secondary carrier.

An initial ranging may be performed to establish the uplink synchronization for the primary carrier.

The length of a ranging code for the initial ranging may be longer than the length of a ranging code for the periodic ranging.

The periodic ranging of the secondary carrier may be performed based on a transmission parameter of the primary carrier.

The activation information may include an indicator indicating whether the periodic ranging is performed to adjust uplink synchronization for the secondary carrier.

The periodic ranging may be performed only when the indicator indicates the performing of the periodic ranging.

The secondary carrier may be selected from at least one assigned carrier which is previously assigned to the mobile station.

In another aspect, a mobile station in multiple carrier system includes a radio frequency (RF) unit to transmit or receive a radio signal, and a processor operatively connected with the RF unit. The processor is configured to establish uplink synchronization for a primary carrier, activate a secondary carrier based on activation information via the primary carrier, and perform a periodic ranging via the secondary carrier to adjust uplink synchronization for the secondary carrier.

In still another aspect, a method of uplink synchronization in a multiple carrier system is provided. The method is performed by a mobile station. The method includes transmitting a first ranging code through a first carrier to a base station, adjusting an uplink transmission parameter of the first carrier based on a time-frequency offset included in a first ranging response received as a response of the first ranging code, activating a secondary carrier based on activation information through the first carrier, transmitting a second ranging code through the second carrier to the base station, and adjusting an uplink transmission parameter of the second carrier by applying a time-frequency offset included in a second ranging response received a response of the second ranging code.

Advantageous Effects of Invention

Adjusting transmission parameters for a secondary carrier is disclosed. Fast uplink synchronization for the secondary carrier can be acquired. As a result, power consumption due to a initial ranging can be reduced.

MODE FOR THE INVENTION

Figure 1:
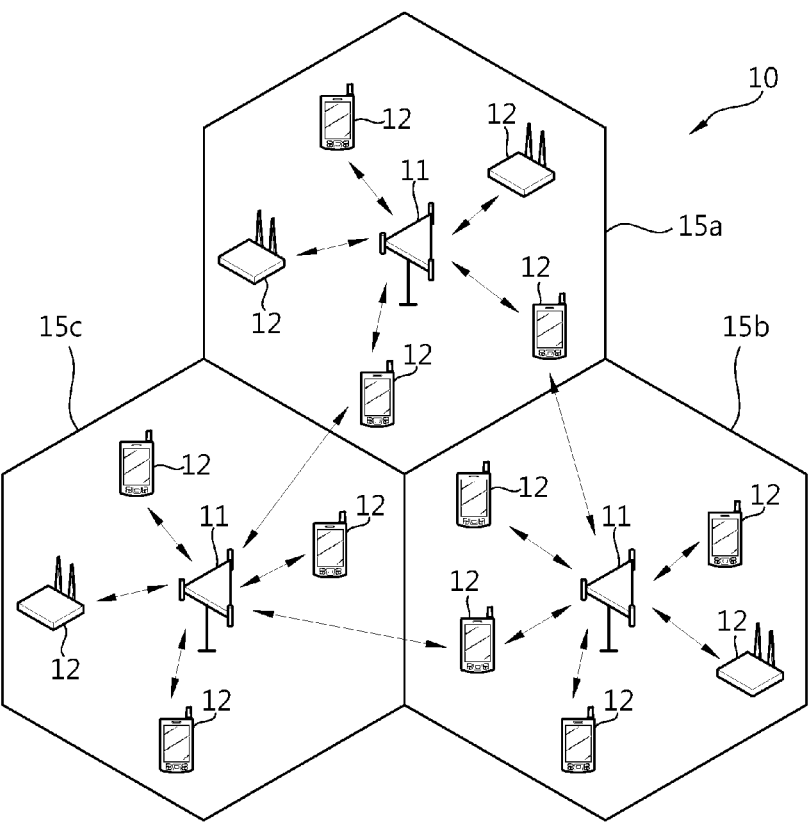
FIG. 1 illustrates a wireless communication system.

FIG. 1 illustrates a wireless communication system. A wireless communication system 10 includes at least one base station (BS) 11. Each base station 11 provides a communication service to particular geographical areas 15*a*, 15*b*, and 15*c* (which are generally called cells). Each cell may be divided into a plurality of areas (which are also called sectors). A mobile station (MS) 12 may be fixed or mobile, and may be referred to by other names such as user equipment (UE), user terminal (UT), subscriber station (SS), wireless device, personal digital assistant (PDA), wireless modem, handheld device, etc. The BS 11 generally refers to a fixed station that communicates with the MS 12 and may be called by other names such as evolved-node B (eNB), base transceiver system (BTS), access point (AP), etc. Downlink (DL) refers to communication from the BS 11 to the MS 12, and uplink (UL) refers to communication from the MS 12 to the BS 11. In the downlink, a transmitter may be a part of the BS 11 and a receiver may be a part of the MS 12. In the uplink, a transmitter may be a part of the MS 12 and a receiver may be a part of the BS 11.

A spectrum aggregation (or bandwidth aggregation or a carrier aggregation) supports a plurality of carriers. A carrier is defined by a bandwidth and a center frequency. The spectrum aggregation is adopted to support increasing throughput, prevent an increase in a cost due to an introduction of a wideband radio frequency (RF) element, and guarantee compatibility with an existing system. For example, if five carriers are assigned as granularity of carrier unit having a 5 MHz bandwidth, it can support a bandwidth of a maximum of 20 MHz.

The spectrum aggregation may be divided into a contiguous spectrum aggregation and a non-contiguous spectrum aggregation. The contiguous spectrum aggregation uses contiguous carriers and the non-contiguous spectrum aggregation uses discontiguous carriers. The number of aggregated carriers may different in uplink and downlink. When the number of downlink carriers and that of uplink carriers are equal, it is called a symmetric aggregation, and when the numbers are different, it is called an asymmetric aggregation.

The size (i.e., the bandwidth) of multiple carriers may vary. For example, when five carriers are used to configure a 70 MHz band, they may be configured as 5 MHz carrier (carrier #0)+20 MHz carrier (carrier #1)+20 MHz carrier (carrier #2)+20 MHz carrier (carrier #3)+5 MHz carrier (carrier #4).

In the following description, a multi-carrier system refers to a system supporting multiple carriers based on the spectrum aggregation. The contiguous spectrum aggregation and/or non-continuous spectrum aggregation may be used in the multi-carrier system, and in addition, either the symmetrical aggregation or the asymmetrical aggregation may be used.

Figure 2:
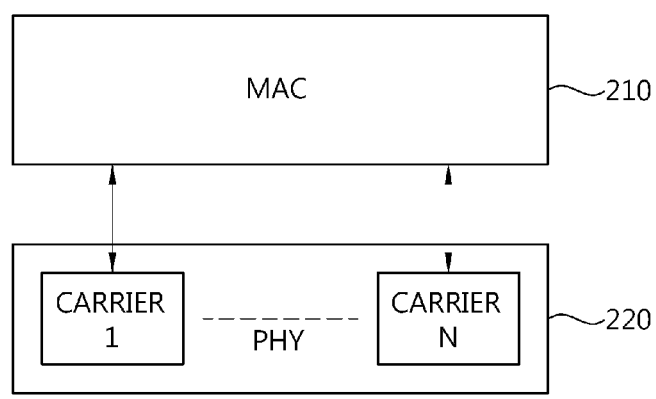
FIG. 2 illustrates an example of a protocol structure for supporting multiple carriers.

FIG. 2 illustrates an example of a protocol structure for supporting multiple carriers. A common medium access control (MAC) entity 210 manages a physical (PHY) layer 220 which uses a plurality of carriers. A MAC management message transmitted by a particular carrier may be applied to other carriers. The PHY layer 220 may operate in a TDD (Time Division Duplex) and/or FDD (Frequency Division Duplex) scheme.

Figure 3:
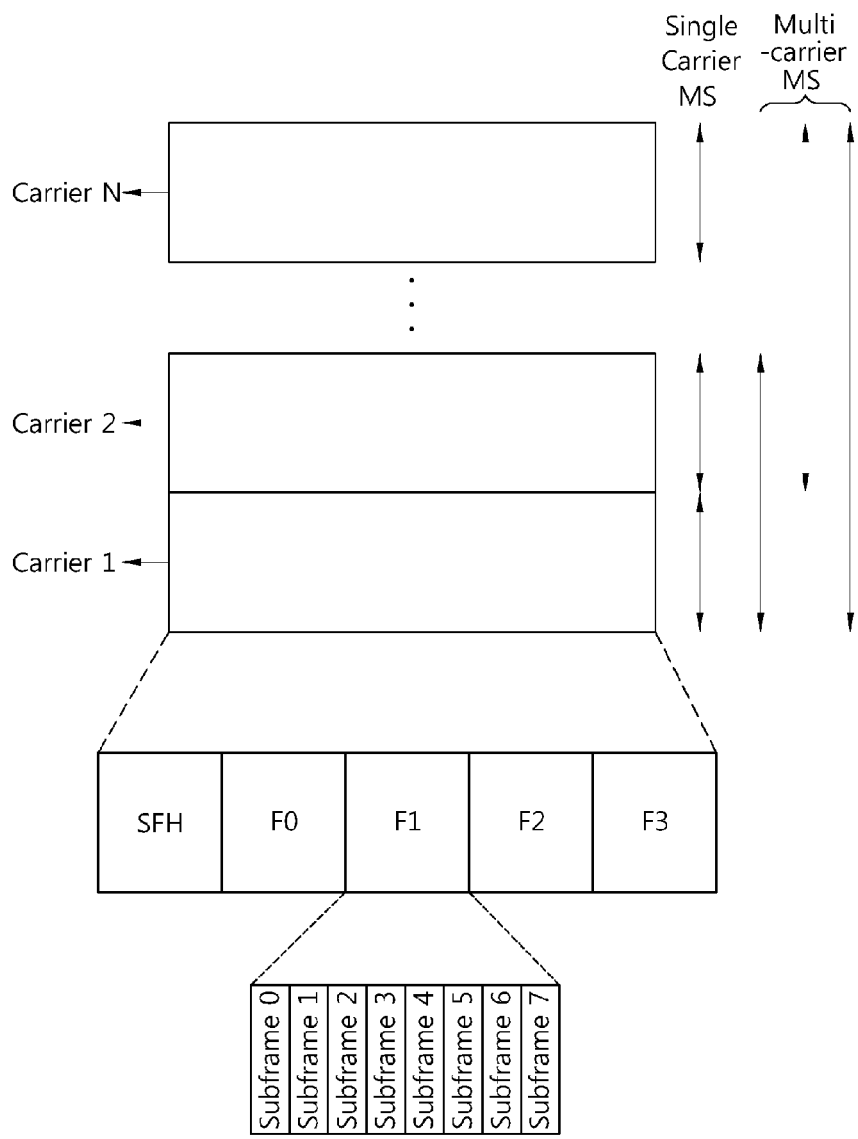
FIG. 3 illustrates an example of a frame structure for operating multiple carriers.

FIG. 3 illustrates an example of a frame structure for operating multiple carriers. A superframe includes four radio frames F0, F1, F2, and F3, and each of the radio frames includes eight subframes. A superframe header (SFH) is located at a first subframe within the superframe. Each carrier may have its own SFH. The SFH is transmitted via a broadcast channel, and carries an essential system parameter which is essential parameter to communicate between a MS and a BS. Some carriers may have only a portion of the SFH. Multiple carriers may be or may not be contiguous to each other. An MS may support one or more carriers according to its capability.

Carriers may be divided into a fully configured carrier and a partially configured carrier depending on their directionality. The fully configured carrier refers to a bidirectional carrier that can transmit and/or receive every control signal and data, and the partially configured carrier refers to a unidirectional carrier that can transmit only downlink data. The partially configured carrier may be largely used for an MBS (Multicast and Broadcast Service) and/or an SFN (Single Frequency Network). he fully configured carrier is a standalone carrier for which all control channels including synchronization, broadcast, multicast and unicast control signaling are configured. The partially configured carrier is a carrier configured for downlink only transmission in TDD or a downlink carrier without paired UL carrier in FDD mode.

Carriers may be divided into a primary carrier and a secondary carrier depending on whether they are activated. The primary carrier refers to a carrier that is constantly activated, and the secondary carrier refers to a carrier that is activated or deactivated according to particular conditions. Activation means that transmission or reception of traffic data is performed or traffic data is ready for its transmission or reception. Deactivation means that transmission or reception of traffic data is not permitted. In the deactivation, measurement is made or minimum information can be transmitted or received. The MS uses only a single primary carrier or one or more secondary carriers along with the primary carrier. The MS may be assigned the primary carrier and/or the second carriers by the BS. A primary carrier is a carrier used by a BS to exchange traffic and PHY/MAC control signaling (e.g., MAC control messages) with an MS. Secondary carriers are additional carriers which the MS may use for traffic, only per BS's specific commands and rules received on the primary carrier. The primary carrier may be a fully configured carrier, by which major control information is exchanged between the BS and the MS. The secondary carrier may be a fully configured carrier or a partially configured carrier, which is allocated according to a request of the MS or according to an instruction of the BS. The primary carrier may be used for entering of the MS into a network or for an allocation of the secondary carrier. The primary carrier may be selected from among fully configured carriers, rather than being fixed to a particular carrier. A carrier set as the secondary carrier may be changed to a primary carrier.

Figure 4:
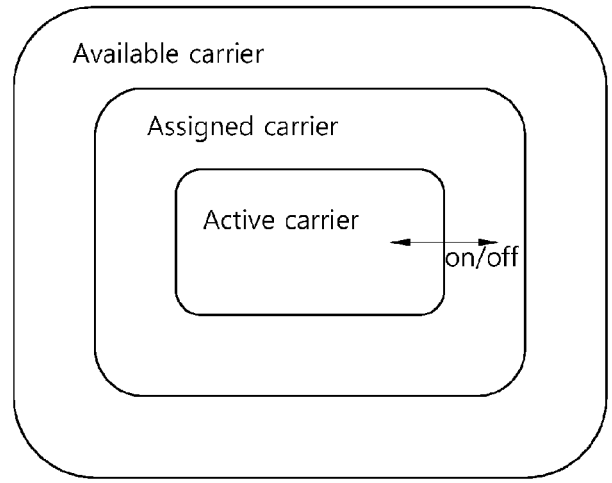
FIG. 4 illustrates a model for managing multiple carriers.

FIG. 4 illustrates a model for managing multiple carriers. Carriers may be classified to have the following three levels:

Available carrier: all the carriers available in the BS

Assigned carrier: a carrier reserved to be assigned to the MS by the BS according to the capability of the MS Active carrier: a carrier used for receiving and/or transmitting control signal/data by the MS.

The characteristics of each carrier are shown in Table 1 below:

TABLE 1

| Name | Definition | Description |
| --- | --- | --- |
| Available carrier | Multiple carriers which are available in a BS | Carriers can be used by the current BS, indicating the capability of the BS. This information may be broadcast. Each available carrier is referred to by a unique physical index in the BS. |
| Assigned carrier | The subset of available carriers which may be potentially used by a MS | Assigned carriers are determined by the BS according to the capability of the MS and a load condition of the BS. The carriers are assigned based on a multi-carrier capability negotiation between the MS and the BS. The MS does not need to perform any operation until when the assigned carriers are activated. Measurement, system information updating, ranging, etc., may be performed according to a request from the BS. Each activated carrier may be referred to by a unique logical index in the MS. |
| Active carrier | The carriers which are in ready state to be used for data transmission | The carriers are activated among those assigned for guaranteeing QoS (Quality of Service) requirements of the MS. A feedback signal such as a CQI (channel quality indicator), an RI (rank indicator), a PMI (Precoding Matrix Indicator), etc., may be transmitted for a link scheduling. The MS may receive resource allocation information through the active carriers to transmit uplink/downlink data. The MS may receive a BCH (broadcast channel) or an SFH (Super frame Header) through the active carrier to acquire system information. The MS may perform ranging through the active carriers for an uplink channel synchronization. |

Ranging will now be described. Ranging, a process of acquiring a proper timing offset, a frequency offset, and power adjustment value, is used by the MS to acquire synchronization with the BS by adjusting an uplink transmission parameter. Ranging may be defined as three types of ranging: an initial ranging, a periodic ranging, and a handover ranging. The initial ranging and the handover ranging use a different ranging code set while sharing the same time/frequency resources. The periodic ranging uses different time/frequency resources from those of the initial ranging and the handover ranging, and also uses a different ranging code set. The initial ranging and handover ranging are used to obtain uplink synchronization when entering a network, and the periodic ranging is used to finely adjust the timing offset, the frequency offset, and/or power adjustment value after uplink synchronization has been established.

Figure 5:
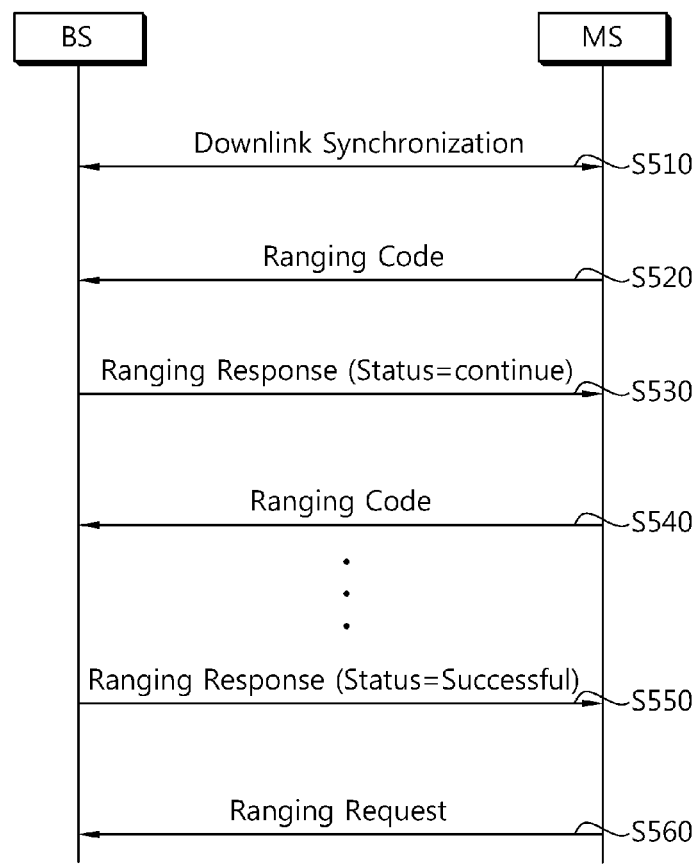
FIG. 5 is a flow chart illustrating an initial ranging process.

FIG. 5 is a flow chart illustrating an initial ranging process. First, downlink synchronization is established between a MS and a BS (S510). Obtaining the downlink synchronization, the MS acquires a basic uplink transmission parameter through an SFH. The SFH includes information regarding ranging codes for an initial ranging and backoff.

The MS transmits a ranging code arbitrarily selected from an available ranging code set via a ranging channel to the BS (S520). Upon receiving the ranging code, the BS broadcasts a ranging response (S530). The received ranging response includes information for identifying the received ranging code and information regarding a time-frequency offset. The time-frequency offset includes at least one of a time offset, a frequency offset, and/or a power offset, and is used by the MS to adjust the uplink transmission parameter.

After adjusting the uplink transmission parameter based on the time-frequency offset, if the status of the ranging response is 'continue', the MS transmits the ranging code to the BS (S540).

Upon receiving the ranging code, if parameter adjustment is not required, the BS sends a ranging response having a status of 'successful' (S550). Upon receiving the ranging response, the MS initiates a basic capability negotiation by sending a ranging request to the BS, and enters a network (S560).

Figure 6:
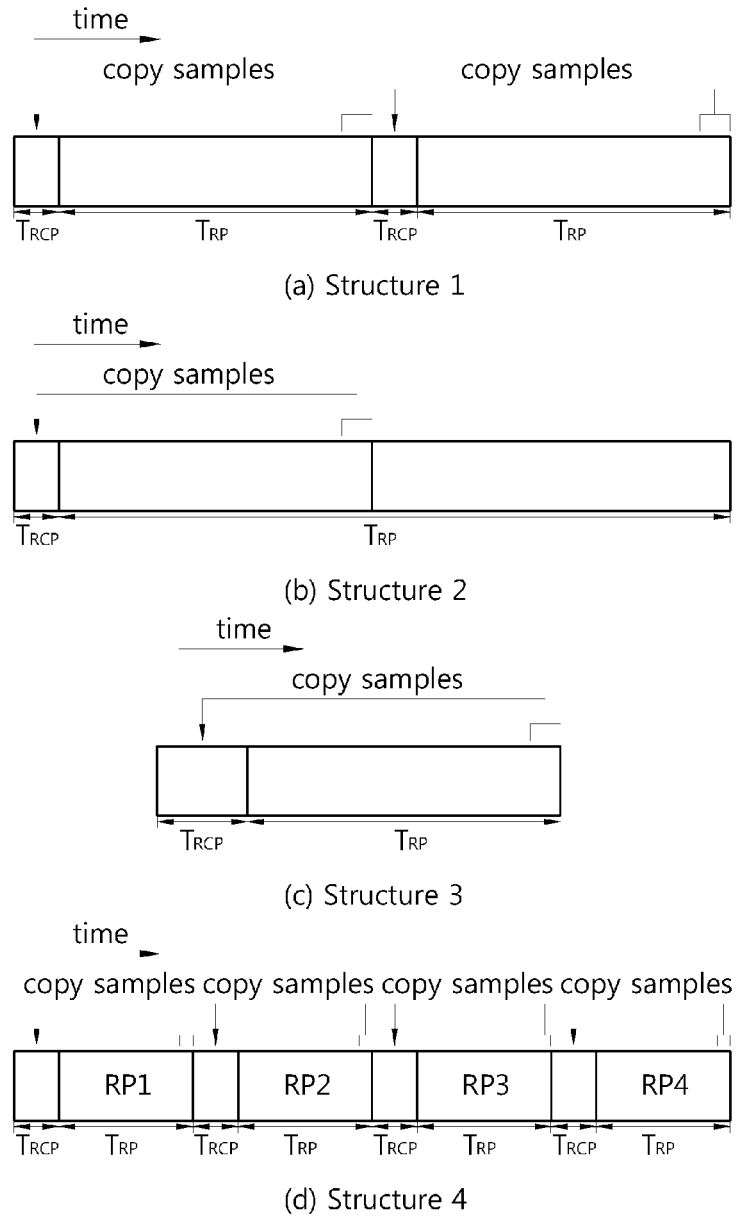
FIG. 6 illustrates ranging channels used for a ranging code.

FIG. 6 illustrates ranging channels used for a ranging code. Ranging channels may used for initial ranging, handover ranging and periodic ranging. TRP indicates the length of a ranging code, and $T_{RCP}$ indicates the length of a ranging cyclic prefix (CP). A ranging channel may be allocated to a designated location within an uplink subframe.

Figure 7:
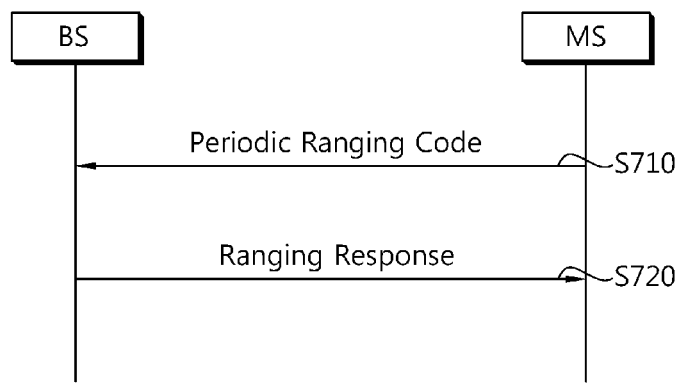
FIG. 7 is a flow chart illustrating a periodic ranging.

FIG. 7 is a flow chart illustrating a periodic ranging. A MS transmits a periodic ranging code arbitrarily selected from an available periodic ranging code set via a periodic ranging channel (S710). The periodic ranging is performed to finely adjust an uplink transmission parameter between the BS and the MS for which the uplink synchronization has been already established. Upon receiving the periodic ranging code, the BS broadcasts a ranging response (S720). The ranging response includes information for identifying the received periodic ranging code and a time-frequency offset. The MS adjusts the uplink transmission parameter based on the time-frequency offset included in the ranging response.

Figure 8:
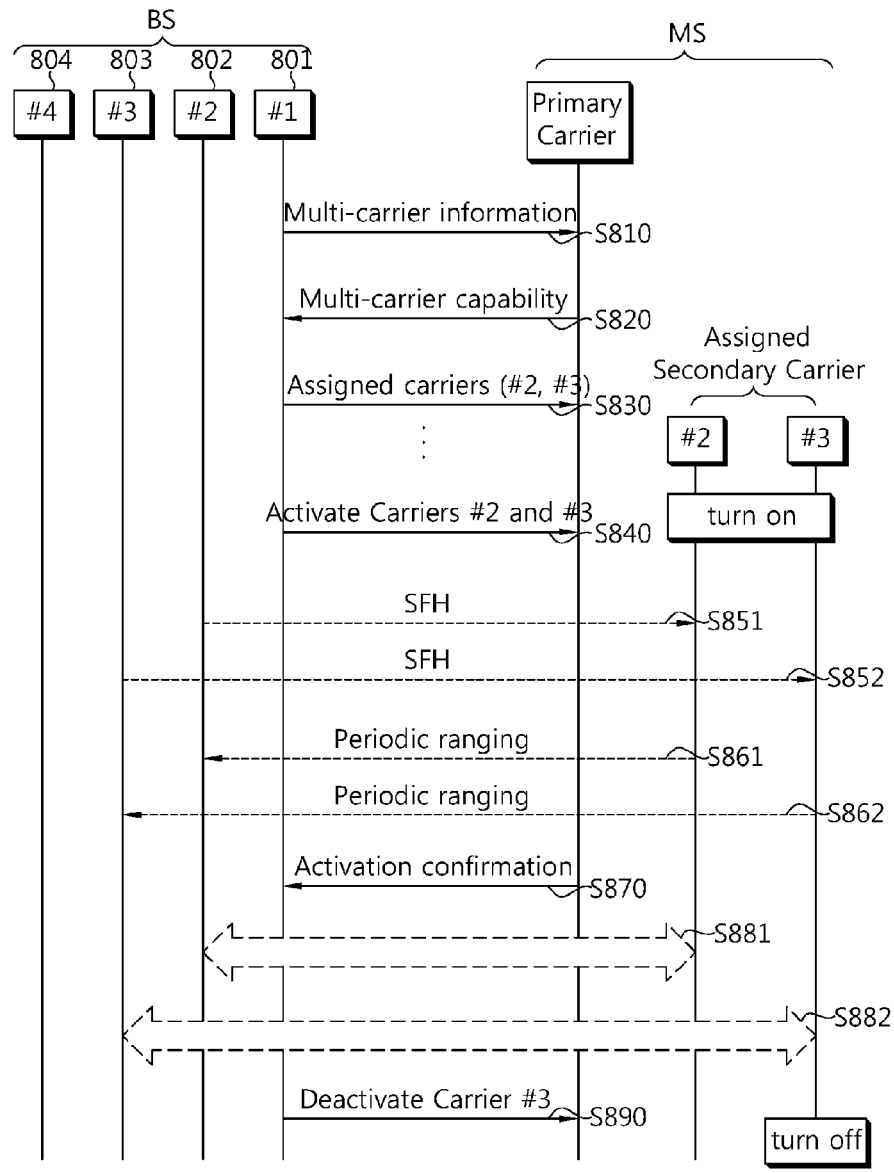
FIG. 8 is a flow chart illustrating communication using multiple carriers according to an exemplary embodiment of the present invention.

FIG. 8 is a flow chart illustrating communication using multiple carriers according to an exemplary embodiment of the present invention. First, the MS attempts a network entry process through the fully configured carrier. The MS detects a preamble of the fully configured carrier to obtain downlink synchronization, and then receives system information, namely, the SFH. The fully configured carrier, by which the system information has been received, is a primary carrier, and afterwards, the primary carrier may be changed according to an instruction of the BS.

In step S810, the BS sends multi-carrier information to the MS through a part of the system information or a MAC management message. The multi-carrier information may include information regarding each available carrier. The multi-carrier information may include at least one of a physical index, a mean frequency, a channel bandwidth, a carrier type (i.e., fully configured carrier or a partially configured carrier), and a preamble index with respect to each available carrier. Here, it is assumed that a total of four carriers (#1, #2, #3, and #4) are available carriers.

In step S820, the MS sends a multi-carrier capability to the BS. The multi-carrier capability may include, for example, a supported multi-carrier mode, the number of supported uplink/downlink carriers, and the like.

In step S830, the BS informs the MS about assigned carriers determined based on the multi-carrier capability. For example, if the carrier #1 801 is used as a primary carrier, the BS may inform the MS that the carrier #2 802 and the carrier #3 802 are assigned carriers.

The MS and the BS may transmit and/or receive data through the primary carrier. Also, an additional carrier may be requested according to a required quality of service.

In step S840, the BS activates the carrier #2 802 and the carrier #3 803 in accordance with activation information via the primary carrier. The activation information may be included in a carrier management message. The activation information may include logical indexes of the activated carriers and activation/deactivation indicators. The activation information may include an indicator indicating whether or not the periodic ranging is to be performed on the activated carriers. The activated carrier #2 802 and the carrier #3 803 are active carriers and secondary carriers.

The MS acquires the SFH, namely, the system information, through the activated carrier #2 802 and the carrier #3 803 (S851 and S852).

The MS attempts periodic ranging for the carrier #2 802 and the carrier #3 803, respectively (S861 and S862). The periodic ranging may be performed only when the indicator indicates the periodic ranging for the activated carrier. Because the MS has already established the uplink synchronization for the primary carrier 801, it can also establish uplink synchronization for the secondary carriers 802 and 803 by finely and simply adjusting the uplink transmission parameter in consideration of the high channel correlation between the carriers. The BS may instruct periodic ranging on the secondary carriers #2 802 and #3 803.

If the BS does not direct the ranging of the secondary carrier, ranging may be omitted. If ranging for the secondary subcarrier is omitted, the MS may use the same time offset, frequency offset, and/or power offset for the secondary subcarrier as in the primary carrier for initial transmission. When the AMS omit the ranging for the secondary carrier(s), the AMS may use the same timing, frequency and power adjustment parameters for the secondary carrier(s) as in the primary carrier. The MS may perform the fine timing, frequency and power adjustment on the secondary carrier(s) through measuring the synch channel and/or pilot on the secondary carrier(s). The instruction of the periodic ranging may be informed by the BS to the MS when the corresponding secondary carriers are activated.

In step S870, the MS may send activation confirmation information to the BS. The activation confirmation information may inform the BS that the MS can successfully transmit or receive data through the activated secondary carriers (i.e., carriers #2 and #3). Subsequently, the BS and the MS can transmit and receive data through the activated secondary subcarriers (i.e., subcarriers #2 and #3). In step S890, the BS deactivates the carrier #3 803. The MS may turn off the carrier #3 803 and transmit and receive data to and from the BS through the primary carrier and the carrier #2, the secondary carrier.

If the channel correlations between the primary and the secondary carriers are very high, the transmission parameters of the secondary carrier(s) could be quite similar with those of primary carrier. If the MS already completed the network entry with the BS over the primary carrier, it does not need to perform the initial ranging over the secondary carrier(s). Therefore, only the periodic ranging instead of initial ranging may be performed over the secondary carrier(s). Once the secondary carriers are activated, the MS may perform the periodic ranging over the active secondary carrier(s) if directed by the BS.

When the BS determines that the uplink transmission synchronization of the MS is acquired during the initial ranging, the BS transmits a ranging response including uplink resource for transmitting a ranging request by the MS. The MS transmits the ranging request by using the uplink resource. The ranging request includes various information required for BS registration. Then, the MS receives a ranging response from the BS. Thereafter, the MS performs a procedure (basic capability negotiation, authentication, etc.) required for BS registration. When the secondary carrier is activated, because the MS has already performed the various procedures required for the BS registration through the primary carrier, the MS does not need to transmit the ranging request again to the BS.

If the MS transmits a initial ranging code through the secondary carrier, the BS may determine that a new MS performs an initial ranging for a network entry on the corresponding carrier. This may cause an unnecessary resource allocation and message exchange between the MS and the BS if the MS is already connected with the BS. Thus, after the secondary carrier is assigned, a ranging code set for performing ranging may be allocated differently from the initial ranging code set. When a ranging code for an initial ranging is a first ranging code and a ranging code for a periodic ranging is a second ranging code, ranging is performed on the primary carrier by using the first ranging code, and ranging is performed on the secondary carrier by using the second ranging code. The MS may adjust the uplink transmission parameter of the secondary carrier by applying the time-frequency offset included in the second ranging response as a response to the second ranging code, to the uplink transmission parameter.

In order to allocate a dedicated code for ranging of the secondary carrier, the BS may inform accordingly through the broadcast channel of the primary carrier. Or, when the MS performs the process for registration to the BS through the primary carrier so the MS and the BS exchange the capability information with respect to the multiple carriers, the dedicated code may be allocated. Or, information regarding the dedicated code may be included in information activating the secondary carrier.

In general, a long ranging code is used as an initial ranging code for the initial uplink synchronization of the MS. But there is no need to use the long code sequence during ranging for the secondary carrier. This is because the ranging for the secondary carrier is made in a state that the uplink synchronization is already established. The MS can quickly adjust the uplink transmission synchronization by transmitting a ranging code shorter than the initial ranging code via the periodic ranging channel, not the initial ranging channel.

If the dedicated ranging code is not allocated for the ranging of the secondary carrier, the BS may instruct the MS to perform the periodic ranging through the primary carrier. The BS may inform the MS about a time point at which periodic ranging is to be performed when instructing the MS to perform the periodic ranging. Upon receiving the instruction to perform the periodic ranging, the MS may perform periodic ranging at a time point instructed by the BS. The instruction of the periodic ranging may be provided when the secondary carrier is activated.

Figure 9:
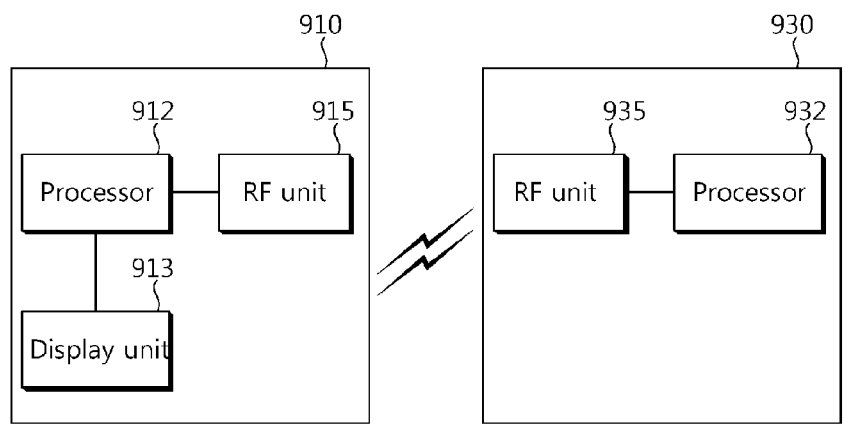
FIG. 9 is a schematic block diagram showing a wireless communication system according to an exemplary embodiment of the present invention.

FIG. 9 is a schematic block diagram showing a wireless communication system to implement an exemplary embodiment of the present invention. A MS 910 includes a processor 912, a display unit 913, and an RF unit 915. The processor 912 performs ranging on multiple carriers. The processor 912 performs initial ranging on a first carrier, and periodic ranging on a second carrier based on the transmission parameter of the primary carrier. In the exemplary embodiment of FIG. 8, the operation of the MS may be implemented by the processor 912. The display unit 912 is connected with the processor 912 and displays various information. The display unit 913 may include well k now elements such as a liquid crystal display (LCD), an organic light emitting diode (OLED), and the like. The RF unit 915 is operatively connected with the processor 912 and transmits and receives a radio signal.

A BS 930 includes a processor 932 and an RF unit 935. The RF unit 935 transmits and receives a radio signal. The processor 932 receives a ranging code, includes a time-frequency offset in a ranging response, and sends it to the MS. The operation of the BS in the exemplary embodiment of FIG. 8 may be implemented by the processor 932.

The processors 912, 932 may include application-specific integrated circuit (ASIC), other chipset, logic circuit and/or data processing device. The RF units 915, 935 may include baseband circuitry to process radio frequency signals. When the embodiments are implemented in software, the techniques described herein can be implemented with modules (e.g., procedures, functions, and so on) that perform the functions described herein. The modules can be executed by processors 912, 932.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the spirit and scope of the appended claims.

The invention claimed is:

1. A method of uplink synchronization in a multiple carrier system, performed by a mobile station, the method comprising:
    establishing uplink synchronization for a primary carrier;
    activating a secondary carrier based on activation information received via the primary carrier; and
    if the activation information includes an indicator indicating whether a periodic ranging is needed to be performed, performing the periodic ranging over the secondary carrier to adjust uplink synchronization for the secondary carrier.

2. The method of claim 1, wherein an initial ranging is performed to establish the uplink synchronization for the primary carrier.

3. The method of claim 2, wherein the length of a ranging code for the initial ranging is longer than the length of a ranging code for the periodic ranging.

4. The method of claim 1, wherein the periodic ranging of the secondary carrier is performed based on a transmission parameter of the primary carrier.

5. The method of claim 1, wherein the periodic ranging is performed only when the indicator indicates the performing of the periodic ranging.

6. The method of claim 1, wherein the secondary carrier is selected from at least one assigned carrier which is previously assigned to the mobile station.

7. A mobile station in multiple carrier system comprising:
    a radio frequency (RF) unit to transmit or receive a radio signal; and
    a processor operatively connected with the RF unit and configured to:
    establish uplink synchronization for a primary carrier;
    activate a secondary carrier based on activation information via the primary carrier; and
    if the activation information includes an indicator indicating whether a periodic ranging is needed to be performed, perform the periodic ranging over the secondary carrier to adjust uplink synchronization for the secondary carrier.

8. The mobile station of claim 7, wherein the processor is configured to perform an initial ranging to establish the uplink synchronization for the primary carrier.

9. The mobile station of claim 8, wherein the length of a ranging code for the initial ranging is longer than the length of a ranging code for the periodic ranging.

10. The mobile station of claim 7, wherein the processor is configured to receive an instruction indicating that the periodic ranging is performed to adjust uplink synchronization for the secondary carrier and the periodic ranging is performed only when the instruction is received.

11. A method of uplink synchronization in a multiple carrier system, performed by a mobile station, the method comprising:
    transmitting a first ranging code through a first carrier to a base station;
    adjusting an uplink transmission parameter of the first carrier based on a time-frequency offset included in a first ranging response received as a response of the first ranging code;
    activating a secondary carrier based on activation information received through the first carrier;
    if the activation information includes an indicator indicating whether a periodic ranging is needed to be performed, transmitting a second ranging code through the second carrier to the base station; and
    adjusting an uplink transmission parameter of the second carrier by applying a time-frequency offset included in a second ranging response received a response of the second ranging code.

12. The method of claim 11, wherein the second ranging code is transmitted by the mobile station to the base station when an indicator indicating the transmission of the second ranging code is received from the base station.

13. The method of claim 11, wherein the length of the first ranging code is longer than that of the second ranging code.

14. The method of claim 11, wherein the first ranging code is used for an initial ranging, and the second ranging code is used for a periodic ranging.

\* \* \* \* \*